Dec. 11, 1928.  
F. L. SCOTT ET AL  
1,694,869

CUTTER CONE FOR WELL DRILLS

Filed Aug. 14, 1926

Floyd L. Scott &
Louis H. Wellensiek   Inventors

By Jesse R. Stone

Attorney

Patented Dec. 11, 1928.

1,694,869

UNITED STATES PATENT OFFICE.

FLOYD L. SCOTT AND LOUIS H. WELLENSIEK, OF HOUSTON, TEXAS, ASSIGNORS TO HUGHES TOOL COMPANY, OF HOUSTON, TEXAS, A CORPORATION OF TEXAS.

CUTTER CONE FOR WELL DRILLS.

Application filed August 14, 1926. Serial No. 129,272.

Our invention relates to the elements of construction of the cutting cones and their bearings as employed on well drills.

In drills previously constructed with conical, or frusto-conical, cutters thereon, the said cutters have been mounted for rotation upon bushings of a frusto-conical shape. Such a cutter and bushing are shown in the Hughes Patent, No. 1,174,577, May 7th, 1916, in which there is a supporting pin integral with the head and the frusto-conical bushing is screwed upon the pin. The cutter is held rotatably upon the bushing by a locking ring fitting behind the head of the bushing and locked to the cutter. Such a bushing operates successfully, but the largest diameter of the bushing comprises a sharp edge at the base of the cone, and this edge may wear excessively because of its greater rubbing circumference. The effect of such wear has been to allow the cutter to incline inwardly, thus tending to gradually narrow the gage of the hole being drilled, and to eventually cause the cutters to contact with each other and lock.

It is an object of this invention to provide a bushing for the cutter which will have the forward end tapered thereon, as is customary, but which will have a large diameter of cylindrical shape tending to decrease wear at that point, and also not only to overcome the tendency of the cutter to incline inwardly when worn, but to act to cause the cutters to spread apart slightly.

It is desired to so mount the cutter for rotation that, when the bearing becomes worn, the cutter will be forced outwardly by the weight of the drill and drill stem.

Figure 2:
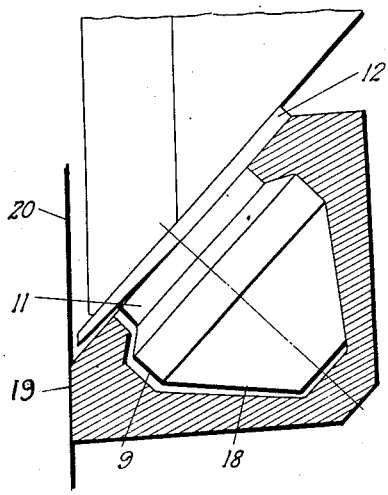
Figure 3:
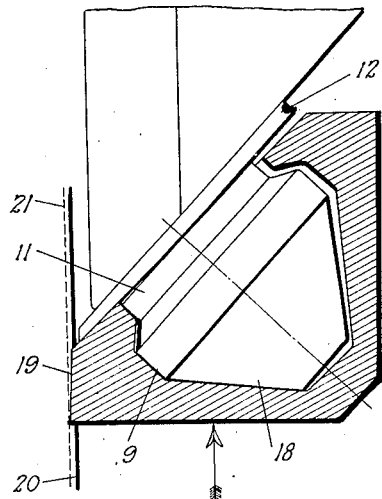
Figure 1:
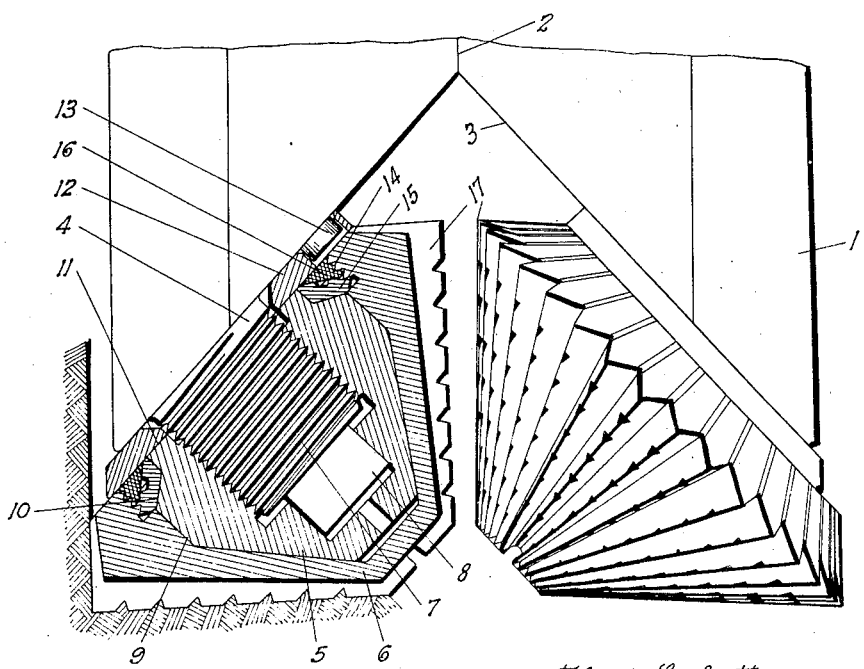

Referring to the drawings herewith, wherein a preferred embodiment of the invention is disclosed:—Fig. 1 is a broken view in elevation of the lower end of a drill showing one of the cones and the bushing in central cross section; Fig. 2 is a diagrammatic view illustrating the manner in which the wear upon the bushing occurs; and Fig. 3 is a similar view illustrating the effect of the wear upon the position of the cutter while the drill is operating. Like numerals of reference are employed to designate like parts in all the views.

The head 1 upon which the cutters are mounted is ordinarily divided longitudinally along a plane 2, the halves of the head being held together by any desired means. The head is so constructed as to provide a V-shaped recess formed by two outwardly inclined faces 3. An inwardly inclined pin 4 is formed on both opposite faces 3 to furnish supports for the bushings 5 and cutters 6 thereon.

The cutter pin 4 is cylindrical and threaded at 7 to receive the bushing. The forward end 8 of the pin is reduced in diameter, and is without threads. It acts simply as a support for the bushing.

The bushing 5 has a central threaded recess to receive said pin. Its outer surface is frusto-conical at the forward end. Its point of greatest diameter is made cylindrical at 9; the diameter is reduced at the inner end at 10 and a short cylindrical neck 11 is separated from the head by a washer 12 held from rotation by a short pin 13 on the head.

The cutter 6 is rotatable on the bushing. It has a central recess shaped to receive the bushing and the open end adjacent the neck 11 of the bushing is threaded at 14 to receive a locking ring 15 which fits the said neck 11 and is beveled on its outer face to provide a space to be filled by metal 16 which is forged or spun thereon to prevent the removal of said locking ring 15. The outer face of the cutter is formed with teeth 17 cut longitudinally thereof to act upon the formation being drilled.

The drill, while operating, is rotated to roll the cutters in a circular track upon the bottom of the hole. The cutters rotate on their bushings which, being stationary, are gradually worn by the friction thereon of the cutter. The drill has thereon the weight of the drill stem above, and this weight is directly downward, so that the wear upon the bushing is on its downward side. The area of largest diameter has the greatest wear because of its greatest rubbing surface. It will be noted from Figs. 2 and 3 that the tapered face 18 is nearly parallel with the bottom of the hole, while the cylindrical surface 9 is inclined inwardly and downwardly. Above the cylindrical surface the neck 11 is also subject to some wear. The result of this wear is illustrated in Fig. 2, where the bit is shown as being raised off the bottom to allow the cutter to hang by its own weight. There is wear particularly on the tapered surface 18, the cylindrical area 9 and the neck 11. This has the effect of allowing the cylindrical area 9 to slide downwardly relative to the cutter as shown in Fig. 3, and of forcing cutter outwardly at its outer beveled face 19 at the wall of the hole. In Figs. 2 and 3 the heavy line 20 indicates the normal wall of the hole where it is cut cylindrically. As the bearings become worn, however, the cutter is gradually tilted outwardly, by the action of the cylindrical surface 9 of the bushing, until the cutter assumes the position shown in Fig. 3, where the dotted line 21 shows the side of the hole being cut.

In tilting outwardly, the cutter bears heavily against the washer 12, which becomes worn also, as shown. In Fig. 3, the upward reaction to the weight of the bit by the rock being cut is indicated by the arrow.

The formation of the bushing 5 with the particular shape indicated has the effect of very gradually increasing the diameter of the hole being drilled as the cutters and bearings become worn so that when the bit is withdrawn to renew the cutters, it will be possible to insert the bit with new cutters directly back to the bottom of the hole without reaming the hole, as is now ordinarily necessary. A large amount of time and expense is thereby saved.

Having thus described our invention, what we claim as new and desire to protect by Letters Patent is:

1. In a rock bit having approximately frusto-conical shaped cutters mounted rotatably on downwardly inclined supporting pins, the combination of bushings for said cutters having tapered lower ends, a cylindrical area of largest diameter inclined downwardly parallel with said pin and forming a comparatively large proportion of the bearing surface, and a constricted cylindrical neck at the upper end thereof.

2. In a rock drill including a head and a downwardly inclined cutter pin thereon, the combination of an approximately frusto-conical shaped bushing surrounding the end of said pin and having a forward tapered surface, an intermediate cylindrical surface of largest diameter forming a large bearing surface, an upwardly tapered shoulder on said bushing adjacent said cylindrical surface, a cylindrical neck at the rearward end thereof, and a cutter fitting rotatably on said bushing.

3. In a rock drill including a head and a downwardly inclined cutter pin thereon, the combination of an approximately frusto-conical shaped bushing fixed to the said pin, a forward tapered surface on said bushing, a materially extensive cylindrical surface of largest diameter, and a constricted neck on the upper end of said bushing, a cutter fitting rotatably on said bushing and presenting an approximately horizontal cutting face to the bottom of the hole.

In testimony whereof, we hereunto affix our signatures this the 11th day of August, A. D. 1926.

FLOYD L. SCOTT.
LOUIS H. WELLENSIEK.